United States Patent [19]

Green

[11] Patent Number: 4,797,105
[45] Date of Patent: Jan. 10, 1989

[54] ONE-WAY BREATHING DEVICE

[76] Inventor: Curtis A. Green, 2520 Wellerman Way, Turlock, Calif. 95380

[21] Appl. No.: 117,325

[22] Filed: Nov. 6, 1987

[51] Int. Cl.$^4$ ............................................. G09B 23/28
[52] U.S. Cl. .................................................... 434/265
[58] Field of Search .................. 434/265, 270; 137/541

[56] References Cited

U.S. PATENT DOCUMENTS

| | | | |
|---|---|---|---|
| 2,904,898 | 9/1959 | Marsden | 434/265 |
| 3,152,404 | 10/1964 | Cheshire et al. | 434/265 |
| 3,274,705 | 9/1966 | Breakspear | 434/265 |
| 4,305,425 | 12/1981 | Mackal et al. | 137/541 |

FOREIGN PATENT DOCUMENTS 240852  10/1962  Australia ............................ 434/265

Primary Examiner—Michael Koczo
Assistant Examiner—Peggy Neils
Attorney, Agent, or Firm—Jerry T. Kearns

[57] ABSTRACT

A one-way breathing device for use with cardiopulmonary resuscitation training mannequins has a hollow tapered conduit for insertion into the mouth of the training mannequin. A soft rubber outwardly extending flange at one end of the conduit is provided for engagement over the lips of the mannequin. A one-way valve at an opposite end of the conduit allows air to be blown into the mouth of the mannequin, but prevents air from exiting the interior of the mannequin through the mouth. In a second embodiment, a second radially extending flange is provided for engagement with the interior of the mouth of the mannequin to retain the conduit in position. Two different types of one-way valves are disclosed. A first type of valve utilizes a circular valve which is spring biased by a coil spring to a closed position. A second type of valve utilizes a spring biased ball check valve. The one-way breathing device prevents contact of the mouth of a person practicing CPR on the mannequin with potentially contaminated surfaces of the mannequin and also prevents potentially contaminated air from the interior of the mannequin from contacting the face of the student. The one-way breathing device is inexpensively constructed and may be disposed after use.

8 Claims, 2 Drawing Sheets

ONE-WAY BREATHING DEVICE

BACKGROUND OF THE INVENTION

1. Field of the Invention

The present invention relates to one-way breathing devices, and more particularly pertains to a new and improved one-way breathing device for use with CPR training mannequins. CPR training mannequins are commonly utilized when instructing fire fighters, paramedics, high school students and the general public on the proper CPR techniques. The mouth portion of the mannequin comes into contact with the mouth of each CPR student. Additionally, the inside of the mannequin is exposed to air exhaled by a wide variety of students. The current practice is to wipe the mouth of the mannequin with a disinfectant before use by each student. This may help to prevent the spread of possible contamination by direct contact of the mouth of a student with the mouth of the mannequin. However, contaminated air from within the mannequin will still be exhausted into the face of the student. With the current wide spread fear of AIDS, students are reluctant to utilize these training mannequins. In order to overcome the fear of students and to prevent the spread of infectious diseases, the present invention provides a one-way breathing device for insertion into the mouth of a CPR training mannequin. This device provides a shield over the mouth of the mannequin and also prevents contaminated air from within the mannequin from being exhaled into the face of the student.

2. Description of the Prior Art

Various types of educational mannequins are known in the prior art. A typical example of such an educational mannequin is to be found in U.S. Pat. No. 3,471,944, which issued to G. Breckwoldt on Oct. 14, 1969. This patent discloses a mannequin for teaching the anatomy of a human mouth and throat. A projector is arranged to display film illustrating various conditions in the throat of the mannequin. In this manner, students are instructed as to the various diseases and disorders that occur in the human throat. U.S. Pat. No. 3,624,942, which issued to R. Klohr on Dec. 7, 1971, discloses a similar slide projection mannequin representing the human mouth and larynx. U.S. Pat. No. 4,209,919, which issued to I. Kirikae et al on July 1, 1980, discloses a mannequin which illustrates the anatomy of a human head and throat. Various components of the model may be selectively removed for observing the internal structure. U.S. Pat. No. 4,596,528, which issued to L. Lewis et al on June 24, 1986, discloses a model of a human face for use by plastic surgery students in learning human anatomy.

While the above mentioned devices are suited for their intended usage, none of these devices provides a CPR mannequin which utilizes a one-way breathing device to protect CPR students from contamination with infectious disease. Inasmuch as the art is relatively crowded with respect to these various types of educational mannequins, it can be appreciated that there is a continuing need for and interest in improvements to such mannequins, and in this respect, the present invention addresses this need and interest.

SUMMARY OF THE INVENTION

In view of the foregoing disadvantages inherent in the known types of educational mannequins now present in the prior art, the present invention provides an improved one-way breathing device for use with CPR training mannequins. As such, the general purpose of the present invention, which will be described subsequently in greater detail, is to provide a new and improved one-way breathing device for CPR mannequins which has all the advantages of the prior art CPR mannequins and none of the disadvantages.

To attain this, representative embodiments of the concepts of the present invention are illustrated in the drawings and make use of a hollow conduit formed from a soft rubber material for insertion into the mouth of a conventional CPR training mannequin. An outwardly extending flange formed at one end of the hollow conduit is dimensioned for engagement over the lips of the CPR mannequin. A one-way valve at the opposite end of the conduit allows air to be blown through the conduit into the CPR mannequin, but prevents air from returning from within the mannequin through the conduit. The resilient nature of the conduit material allows the outwardly extending flange to conform to the face of the mannequin and also secures the conduit within the mouth of the mannequin. A second peripheral flange may be provided for engagement with the interior surface of the mannequin's mouth to further enhance securement of the device. A circular valve having an axially extending valve stem may be utilized to close an air passage at one end of the conduit. The valve is biased by a coil spring to a closed position, and is opened by the force of air blown into the conduit. Alternatively, a ball check type valve may be utilized to selectively close the conduit air passage. The one-way breathing device of the present invention is constructed from very inexpensive materials and thus may be economically disposed after each use, preventing the transmittal of infectious diseases between CPR students.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved one-way breathing device for CPR mannequins which has all the advantages of the prior art CPR training mannequins and none of the disadvantages.

It is another object of the present invention to provide a new and improved one-way breathing device which may be easily and efficiently manufactured and marketed.

It is a further object of the present invention to provide a new and improved one-way breathing device which is of a durable and reliable construction.

An even further object of the present invention is to provide a new and improved one-way breathing device which is susceptible of a low cost of manufacture with regard to both materials and labor, and which accordingly is then susceptible of low prices of sale to the consuming public, thereby making such one-way breathing devices economically available to the buying public.

Still yet another object of the present invention is to provide a new and improved one-way breathing device which provides in the apparatuses and methods of the prior art some of the advantages thereof, while simultaneously overcoming some of the disadvantages normally associated therewith.

Still another object of the present invention is to provide a new and improved one-way breathing device for use with CPR training mannequins which prevents infectious diseases from being transmitted between CPR students.

Yet another object of the present invention is to provide a new and improved one-way breathing device for use with CPR training mannequins which utilizes a one-way valve to prevent contaminated air from within the mannequin from being exhaled into the face of a CPR student.

Even still another object of the present invention is to provide a new and improved one-way breathing device for use with CPR training mannequins which provides a disposable shield for engagement over the mouth of the mannequin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
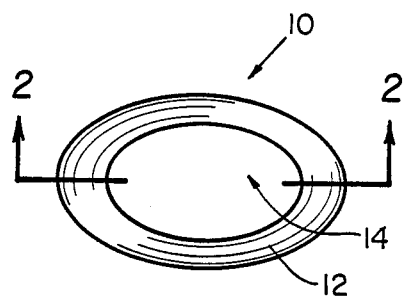
FIG. 1 is a front view of the one-way breathing device of a first embodiment of the present invention.

With reference now to the drawings, and in particular to FIG. 1 thereof, a new and improved one-way breathing device embodying the principles and concepts of the present invention and generally designated by the reference numeral 10 will be described.

More specifically, it will be noted that the first embodiment 10 of the invention includes an outwardly extending flange 12 of a generally oval configuration. A central air passage 14 is formed through the flange 12.

Figure 2:
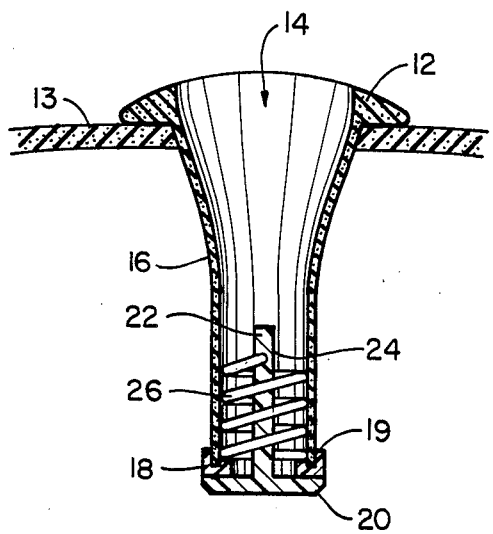
FIG. 2 is a cross sectional view taken along line 2—2 of FIG. 1, illustrating the internal construction of the one-way breathing device of the first embodiment of the present invention.

With reference now to FIG. 2, it may be seen that the outwardly extending flange 12 engages the exterior face 13 of a conventional CPR training mannequin. A hollow conduit 16 is integrally formed with the flange 12, and is shown inserted into the mouth of the CPR training mannequin. The flange 12 and conduit 16 are formed from a soft flexible rubber material. This allows the flange 12 to conform to the lip contours of the mannequin. The flange 12 overlies the lips of the mannequin, and provides a shield between the mannequin lips and the mouth of a CPR student. A valve seat 18, which may be formed from a rigid plastic material, has a groove 19 engaged over an opposite end of the conduit 16. A circular valve 20 overlies the air passage at the end of the conduit 16, thus blocking air flow through the air passage 14. A valve stem 22 is integrally formed with the valve 20 and extends axially into the conduit 16. A coil spring 26 surrounds the valve stem 22 and has one end 24 secured through a transverse hole at the end of the valve stem 22. An opposite end of the coil spring 26 engages the valve seat 18. It may now be understood that the coil spring 26 serves to bias the valve 20 to a closed position. The valve assembly 18 and 20 may be formed as a disposable, replaceable tip portion.

Figure 3:
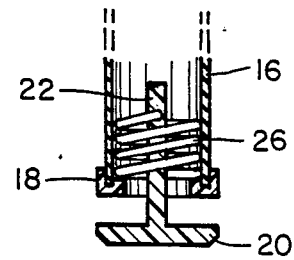
FIG. 3 is a partial cross section illustrating the one-way breathing device of the first embodiment of the present invention in an open position.

With reference now to FIG. 3, it may be understood that a CPR student, by blowing air through the passage 14 in the conduit 16, may force the valve 20 to the illustrated open position, against the bias of the coil spring 26. This allows a CPR student to blow air into the interior of the CPR training mannequin, but prevents air from the interior of the mannequin from returning through the air passage 14 in the conduit 16. This prevents contaminated air from the interior of the mannequin from being exhaled into the face of a CPR student. It should be understood that the coil spring 26 has a spring constant carefully selected to allow the valve 20 to be blown open without undue exertion by the CPR student. The coil spring 26 is nonetheless sufficient to effectively close the valve 20 when the CPR student stops blowing air through the air passage 14 in the conduit 16.

Figure 4:
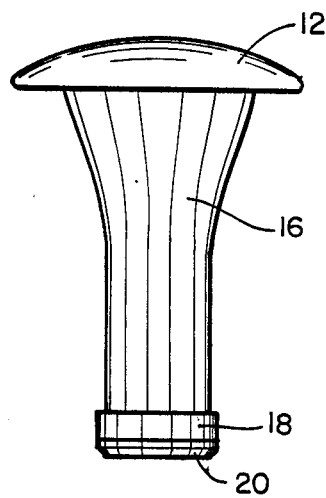
FIG. 4 is a side view of the one-way breathing device of the first embodiment of the present invention.

With reference now to FIG. 4, it may be seen that the exterior surface of the conduit 16 is tapered from a wide end adjacent the flange 12, to a narrow end adjacent the valve 20. This feature, in combination with the resilient nature of the material of the conduit 16, allows the wide end of the conduit 16 to firmly engage the mouth of the CPR mannequin. This prevents the one-way breathing device 10 of the present invention from falling out of the mannequin's mouth. The one-way breathing device 10 of the present invention may be easily removed by applying outward force on the flange 12.

Figure 5:
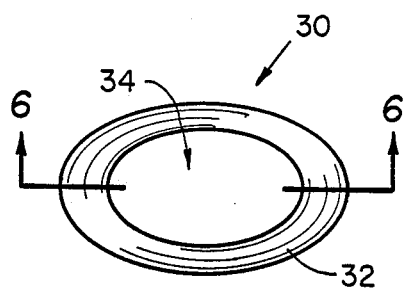
FIG. 5 is a front view of a one-way breathing device according to a second embodiment of the present invention.
Figure 6:
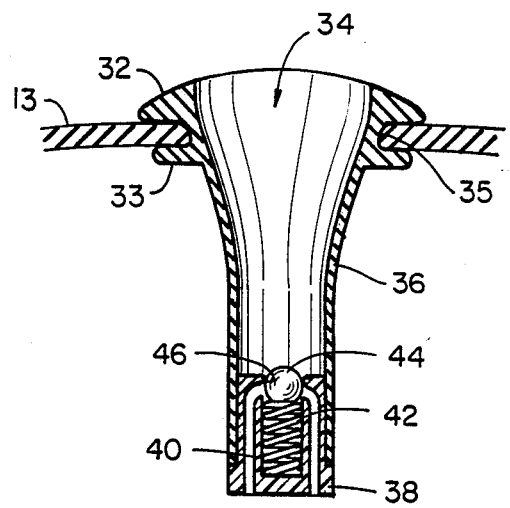
FIG. 6 is a cross sectional view taken along line 6—6 of FIG. 5, illustrating the internal construction of a one-way breathing device according to the second embodiment of the present invention.

With reference now to FIG. 5, it may be seen that a second embodiment 30 of the present invention has a generally oval outwardly extending flange 32 through which an air passage 34 is formed. As shown in FIG. 6, the flange 32, which is formed from a soft rubber material, overlies the lips of a CPR training mannequin 13. A second outwardly extending flange 33 is dimensioned to engage the interior mouth surfaces of the mannequin 13. These first and second flanges 32 and 33 form a circumferential groove 35 which engages the edges of the mouth of the CPR training mannequin 13. This provides a secure fastening of the one-way breathing device 30 of the second embodiment of the present invention within the mouth of the CPR training mannequin 13. The flanges 32 and 33 are formed integrally with a hollow conduit 36, which is also formed from a soft rubber material. A valve seat 38 is formed from a synthetic plastic material and is received within an opposite end of the conduit 36. A spring seat 40 captures a coil spring 42 which abuts a ball check valve 44. The coil spring 42 urges the ball 44 into a closed position against an air passage seat 46. The valve assembly 38 and 40 may be formed as a replaceable tip portion.

Figure 7:
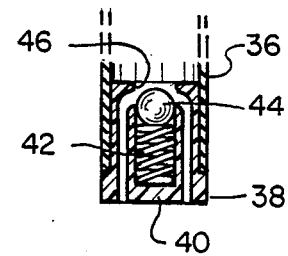
FIG. 7 is a partial cross sectional view illustrating the second embodiment of the one-way breathing device of the present invention in an open position.

With reference now to FIG. 7, it may be understood that a CPR training student may, by blowing air through the passage 34, force the ball check valve 44 into an open position against the bias of the coil spring 42. This allows the CPR training student to blow air into the mannequin, but prevents contaminated air from the interior of the mannequin from being exhaled into the face of the CPR training student.

Figure 8:
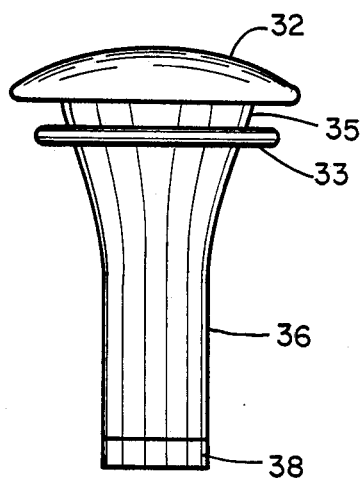
FIG. 8 is a side view of the one-way breathing device according to the first embodiment having a second flange of the second embodiment of the present invention.

FIG. 8 illustrates a side view of the one-way breathing device 30 of the first or second embodiment of the present invention. It may be seen that the first flange 32 and second flange 33 form a circumferential groove 35.

Both of the embodiments of the one-way breathing device of the present invention are constructed from very inexpensive materials and thus, may be economically disposed after use by each CPR student. It is contemplated that the one-way breathing devices will be marketed in individual sealed packages together with a towelette treated with a disinfectant. Every time a different student performs CPR on a mannequin, the face of the mannequin would then be wiped with the towelette and a new one-way breathing device inserted into the mouth of the mannequin. This would help prevent the spread of various infectious diseases. Thus, it may now be understood that the one-way breathing device of the present invention performs the dual function of providing a shield over the lips of a CPR training mannequin, and prevents contaminated air from within the mannequin from being exhaled into the face of the student.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved one-way breathing device for use with a CPR training mannequin having a mouth with lips, comprising:

hollow conduit means dimensioned for insertion into the mouth of the mannequin;
   radially outwardly extending flange means at one end of said conduit means for engagement over the lips of the mannequin;
   said flange means formed from a soft flexible material configured to resemble human lips and dimensioned for sealing conformance with the mannequin lips;
   one-way valve means in said conduit for allowing air to be blown through said conduit means into said mannequin and for preventing air from returning through said conduit means from said mannequin; and
   said conduit means tapering from a wide end adjacent said flange means to a narrow end adjacent said one-way valve means.

2. A new and improved one-way breathing device for use with a CPR training mannequin having a mouth with lips, comprising;

a hollow conduit dimensioned for insertion into the mouth of the mannequin;
   a radially outwardly extending flange at one end of said conduit;
   said flange formed from a soft flexible material configured to resemble human lips and dimensioned for sealing conformance with the mannequin lips;
   a circular valve seat having a central air passage mounted at an opposite end of said conduit;
   said valve seat having a circular groove for engagement with a circular end wall of said hollow conduit;
   a valve for selectively opening and closing said air passage;
   a valve stem attached to said valve, said valve stem extending through said air passage;
   a coil spring surrounding said valve stem and biasing said valve to a closed position;
   one end of said coil spring attached to said valve stem;
   an opposite end of said coil spring abutting said valve seat, whereby air blown through said conduit will open said valve against the bias of said coil spring;

said valve stem having a transverse aperture and one end of said coil spring secured in said aperture; and
said hollow conduit tapered from a larger diameter adjacent said radially outwardly extending flange to a smaller diameter adjacent said valve seat.

3. The one-way breathing device of claim 1, wherein said one-way valve means comprises a valve seat secured to an end of said hollow conduit means opposite said outwardly extending flange means;
   a valve stem extending through said valve seat axially into said hollow conduit means;
   a valve formed integrally with said valve stem disposed over an air outlet passage in said valve seat;
   a coil spring within said hollow conduit means surrounding said valve stem;
   one end of said coil spring secured to said valve stem and an opposite end of said coil spring abutting said valve seat for biasing said valve to a closed position.

4. The one-way breathing device of claim 3, wherein said valve seat has a groove for engagement over an end of said hollow conduit means.

5. The one-way breathing device of claim 3, wherein said valve stem is provided with a transverse aperture and one end of said coil spring is secured in said aperture.

6. The one-way breathing device of claim 1, wherein said one-way valve means comprises a ball check valve.

7. The one-way breathing device of claim 1, further comprising a second outwardly extending flange means spaced from said first flange means and forming a circumferential groove around said conduit means for engagement with the mouth of the CPR training mannequin.

8. The one way breathing device of claim 2, further comprising a second outwardly extending flange formed from a soft flexible rubber material formed on said hollow conduit and spaced from said first outwardly extending flange.

* * * * *